United States Patent
Carroll et al.

(10) Patent No.: US 12,532,800 B1
(45) Date of Patent: Jan. 27, 2026

(54) ADJUSTABLE HANDLE FOR BROADCAST SPREADER

(71) Applicant: Brinly-Hardy Company, Jeffersonville, IN (US)

(72) Inventors: Nicholas Carroll, Georgetown, IN (US); Edward J. Pupkiewicz, Jeffersonville, IN (US)

(73) Assignee: Brinly-Hardy Company, Jeffersonville, IN (US)

( * ) Notice: Subject to any disclaimer, the term of this patent is extended or adjusted under 35 U.S.C. 154(b) by 398 days.

(21) Appl. No.: 18/361,017

(22) Filed: Jul. 28, 2023

Related U.S. Application Data

(60) Provisional application No. 63/394,339, filed on Aug. 2, 2022.

(51) Int. Cl.
*A01C 7/08* (2006.01)
*A01C 7/10* (2006.01)

(52) U.S. Cl.
CPC .............. *A01C 7/085* (2013.01); *A01C 7/102* (2013.01)

(58) Field of Classification Search
CPC .................... A01C 7/08–085; A01C 7/10–102
USPC ....................................................... 405/279
See application file for complete search history.

(56) References Cited

U.S. PATENT DOCUMENTS

| | | | | |
|---|---|---|---|---|
| 3,404,427 | A * | 10/1968 | Mack | B62B 1/20 16/427 |
| 3,882,569 | A * | 5/1975 | Vanderveer | A47J 45/10 16/427 |
| 6,616,074 | B2 * | 9/2003 | Courtney et al. | A01C 15/008 239/685 |
| 8,074,904 | B1 * | 12/2011 | Hobbs | A01C 17/006 239/668 |
| 8,474,735 | B2 * | 7/2013 | Hobbs, Jr. et al. | A01C 17/006 239/685 |

* cited by examiner

*Primary Examiner* — Tara Mayo
(74) *Attorney, Agent, or Firm* — Stites & Harbison, PLLC; David W. Nagle, Jr.; Gary N. Stewart

(57) ABSTRACT

An adjustable handle for a broadcast spreader includes: a base portion that is configured to be operably connected to a gate of a broadcast spreader, such that, when the base portion is operably connected to the gate, movement of the base portion causes a corresponding movement of the gate; and one or more links. Each link of the adjustable handle is configured to be selectively connected to the base portion, such that each link can be selectively connected to a distal end of the base portion at different locations along the length of the link to affect the height and/or configuration of the adjustable handle. The adjustable handle can include multiple links which can be selectively positioned and arranged in different configurations to affect the overall height and shape of the adjustable handle.

16 Claims, 12 Drawing Sheets

ADJUSTABLE HANDLE FOR BROADCAST SPREADER

CROSS-REFERENCE TO RELATED APPLICATION

The present application claims priority to U.S. Patent Application Ser. No. 63/394,339 filed on Aug. 2, 2022, the entire disclosure of which is incorporated herein by reference.

BACKGROUND OF THE INVENTION

A broadcast spreader (which may also be referred to as a rotary spreader or a spin spreader) is commonly used to distribute granular materials, such as fertilizers, pelletized lime, insecticides, salts, ice melts and/or mulch to a lawn, field, pasture, paved surface, or other outdoor surface. A broadcast spreader is generally comprised of a hopper that holds the granular material. The hopper may be mounted on a frame with wheels and provided with a handle so that it can be pushed. The hopper may also be mounted or otherwise connected to a tractor, truck, riding mower, all-terrain vehicle (ATV), zero-turn radius mower (ZTR), or other vehicle. In this regard, the hopper may be supported on a frame with wheels and towed behind a vehicle, or it may be mounted directly to the vehicle. Whether pushed, towed behind a vehicle, or mounted to a vehicle, the broadcast spreader distributes granular material to a lawn, field, pasture, paved surface, or other outdoor surfaces.

In this regard, the hopper has a discharge port (or opening) in a lower portion thereof, with the granular material passing through this discharge port under the force of gravity, where the material is then distributed onto a rotating fan which propels the material onto the lawn, field, paved surface, or other outdoor surface. The flow of material, i.e., the amount distributed onto the rotating fan, is commonly controlled by a gate (or shutter). The gate can be selectively positioned relative to the discharge port to regulate the flow of material. In other words, the gate may be moved to allow a greater or lesser amount of material to pass through the discharge port. In any event, such a construction for a broadcast spreader is well-known and understood by one of ordinary skill in the art. For example, U.S. Pat. No. 6,616,074, which is incorporated herein by reference, identifies multiple prior art references that describe the construction of a common broadcast spreader. For other examples, reference is made to U.S. Pat. No. 8,474,735 entitled "Broadcast Spreader" and U.S. Pat. No. 8,074,904 entitled "Broadcast Spreader with a Directional Control Assembly," each of which is assigned to the assignee of the present application and are also incorporated herein by reference.

When the broadcast spreader is towed behind a truck, riding mower, all-terrain vehicle (ATV), zero-turn radius mower (ZTR), or other vehicle, to control operation of the gate, and thus control the flow of material, a control handle is typically positioned behind the operator. For example, and as described and illustrated in U.S. Pat. No. 8,074,904, "when the broadcast spreader is assembled, the control handle 210 is pushed rearward to the position shown in FIG. 8, to make sure that the second plate 70 effectively closes the pathway for the granular material from the hopper 12 through the discharge port 13 and onto the rotating fan 30. Then, the control handle 210 can be pushed forward, rotating about the pivot axis 260 until the rear opening 80 defined by the second plate 70 is in registry with the discharge port 13 defined by the hopper 12. Once the appropriate position of the control handle 210 has been established, the stop plate 272 can be moved to establish this 'stop' position, thus marking the fully open position." However, it may not always be easy for an operator to reach and use the control handle while seated in or on the vehicle.

SUMMARY OF THE INVENTION

The present invention is an adjustable handle for a broadcast spreader, and, more specifically, an adjustable handle for a broadcast spreader which includes multiple components that can be selectively positioned and/or arranged in various configurations to allow an operator to choose a configuration that is most convenient for the operator.

An exemplary adjustable handle for a broadcast spreader made in accordance with the present invention includes: an elongated base portion that is configured to be operably connected to a gate of a broadcast spreader, such that, when the base portion is operably connected to the gate, movement of the base portion causes a corresponding movement of the gate. The adjustable handle also includes one or more links. Each link of the one or more links is configured to be connected, directly or indirectly, to the base portion, such that each link can be selectively connected to the base portion to affect the overall height and configuration (or shape) of the adjustable handle.

In some embodiments, a proximal end of the base portion defines an opening for receiving a linking rod connected to the gate of the broadcast spreader and another opening for receiving a pivot pin that defines a pivot axis about which the base portion can rotate to transition the gate between a first position in which it covers a discharge port defined by a hopper of the broadcast spreader and a second position uncovering the discharge port.

In some embodiments, the adjustable handle includes multiple links which can be selectively positioned and arranged in different configurations to affect the overall height and configuration of the adjustable handle. In some embodiments, each link of the adjustable handle defines an elongated slot for receiving one or more fasteners to facilitate connection of the link to either the base portion or another link of the adjustable handle. Further to this end, in some embodiments, the base portion and each link of the adjustable handle defines at least two openings configured to receive one or more fasteners inserted through the elongated slot of a respective link. In such embodiments, each link can be mounted to the base portion or another link of the adjustable handle by aligning the elongated slot defined by the link with either the at least two openings defined by the base portion or the at least two openings defined by another link, and then inserting one or more fasteners therethrough. The overall height of the adjustable handle can thus be adjusted in such embodiments by inserting fasteners in different portions of the elongated slot.

In some embodiments, the adjustable handle includes at least one link that defines a first leg and a second leg that are angled relative to each other. In some embodiments, the adjustable handle includes at least two angled links. In some embodiments, each link of the adjustable handle is an angled link. In some embodiments, the first leg and the second leg of each angled link is oriented relative to one another at an angle of approximately 135°. In some embodiments, the adjustable handle includes at least one straight link having no bend or curvature.

In some embodiments, the adjustable handle further includes a grip configured to wrap around and/or enclose an end of a link defining a terminal end of the adjustable handle.

A broadcast spreader including an adjustable handle made in accordance with the present invention is also disclosed herein.

DETAILED DESCRIPTION OF THE INVENTION

The present invention is an adjustable handle for a broadcast spreader which includes multiple components that can be selectively positioned and/or arranged in various configurations to allow an operator to choose a configuration that is most convenient for the operator.

Figure 1:
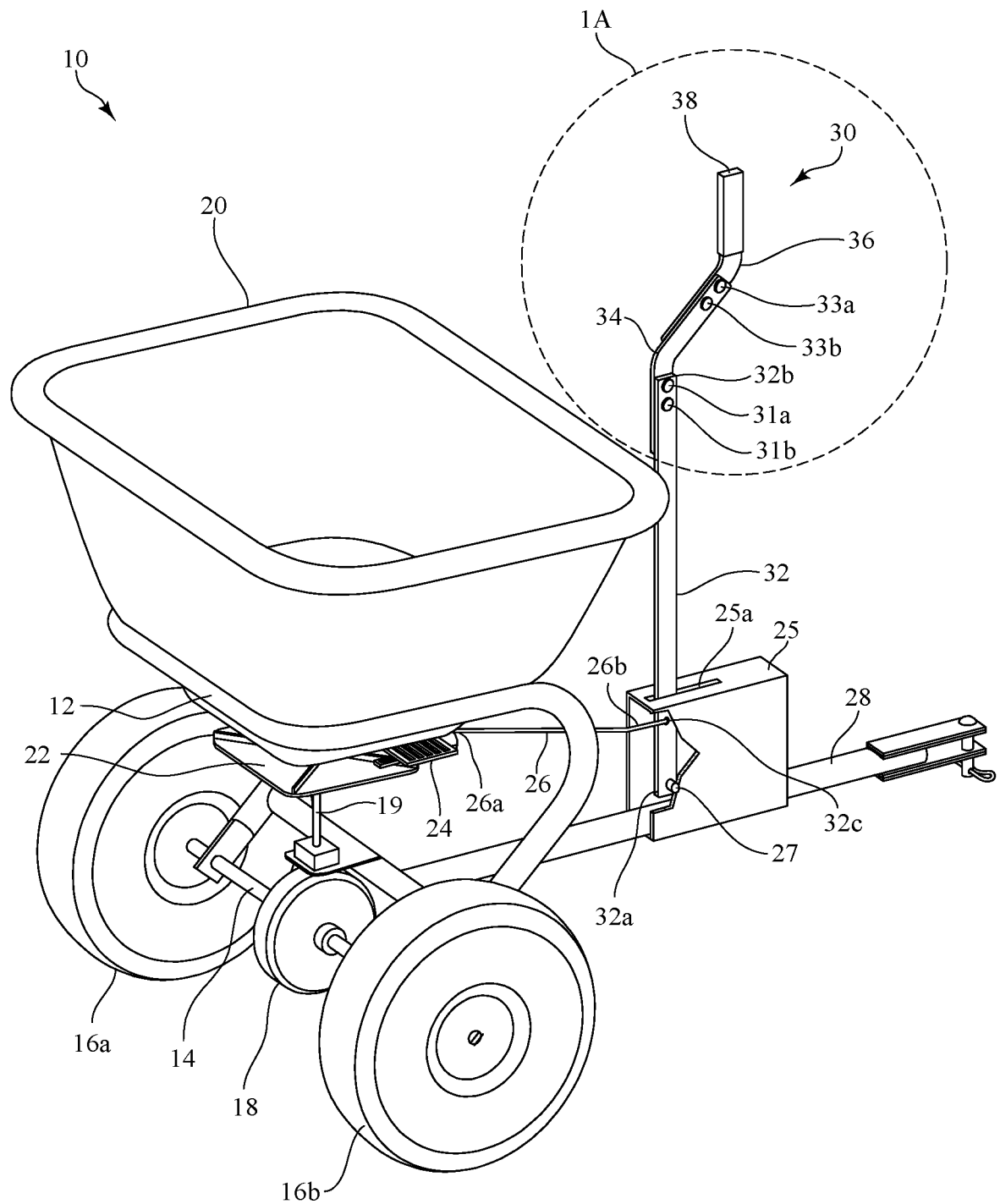
FIG. 1 is a perspective view of a broadcast spreader, including an exemplary adjustable handle made in accordance with the present invention.

FIG. 1 is a perspective view for a broadcast spreader 10 including an exemplary adjustable handle 30 made in accordance with the present invention.

As shown in FIG. 1, the broadcast spreader 10 generally includes a hopper 20 that is mounted on a support frame 12. An axle 14 extends through a lower portion of the support frame 12, with wheels 16a, 16b mounted on either end of the axle 14. The support frame 12 is connected to a tow bar 28, which is used to link the broadcast spreader 10 to a tractor or other vehicle (not shown). Referring still to FIG. 1, like most broadcast spreaders, the exemplary broadcast spreader 10 includes a discharge port (or opening) (not shown) defined through a bottom surface of the hopper 20 through which granular material stored in the hopper 20 can pass under the force of gravity and be distributed onto a rotating fan 22 to propel the material onto a lawn, field, pasture, paved surface, or other outdoor surface. With respect to the term "granular material," as noted above, this term is intended to be a generic descriptor of the types of materials that can be distributed using a broadcast spreader. As such, the term "granular material" includes, but is not limited to, seed, fertilizers, pelletized lime, insecticides, salts, ice melts, and/or mulch.

Referring still to FIG. 1, in this exemplary embodiment, the broadcast spreader 10 utilizes the movement of the wheels 16a, 16b to drive the rotating fan 22. Specifically, rotation of the fan 22 is achieved through use of a transmission 18 that couples the axle 14 of the wheels 16a, 16b of the broadcast spreader 10 to a shaft 19 that drives the fan 22. In other embodiments, a motor may be used to drive the fan 22.

Referring still to FIG. 1, a gate 24 is movably mounted to the hopper 20, such that the gate 24 can transition between (a) a first position, where the discharge port is covered by the gate 24 so as to prevent granular materials from exiting the hopper 20 and (b) a second position, where the discharge port is uncovered to release and regulate granular materials delivered to the fan 22. A linking rod 26 with a proximal end 26a is connected to the gate 24, and the operation of the gate 24, via the linking rod 26, is controlled by the adjustable handle 30.

Figure 1A:
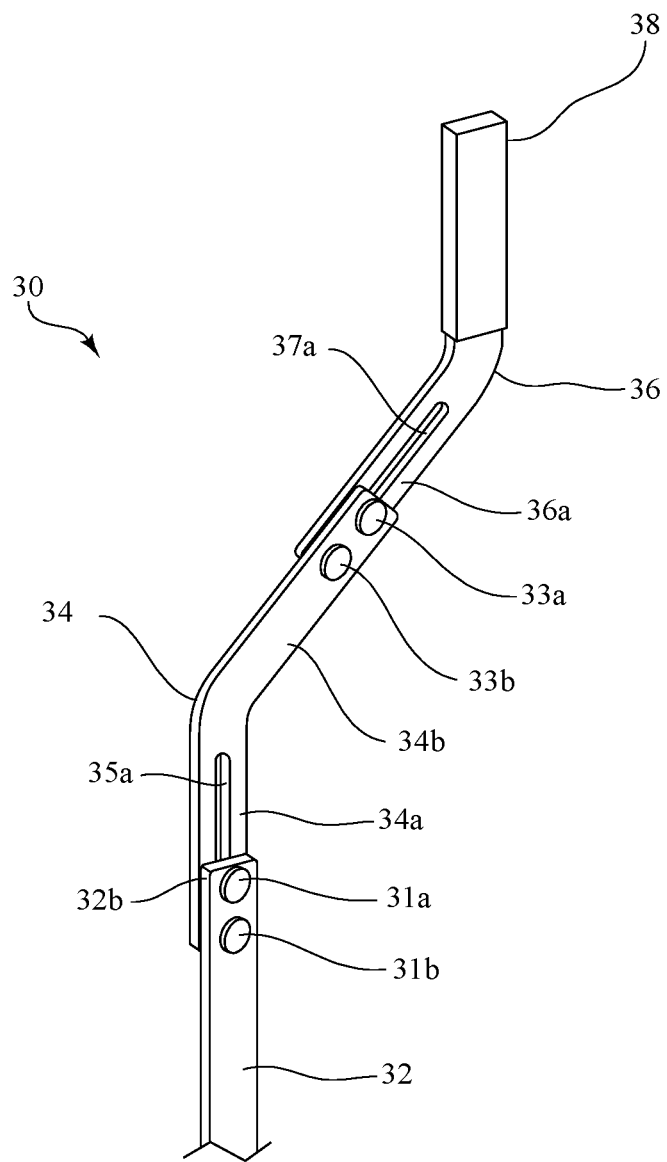
FIG. 1A is a partial perspective view of the exemplary adjustable handle of FIG. 1.

FIG. 1A is a partial perspective view of the exemplary adjustable handle 30 of FIG. 1, but with the adjustable handle 30 in an extended position as compared to FIG. 1.

Figure 2:
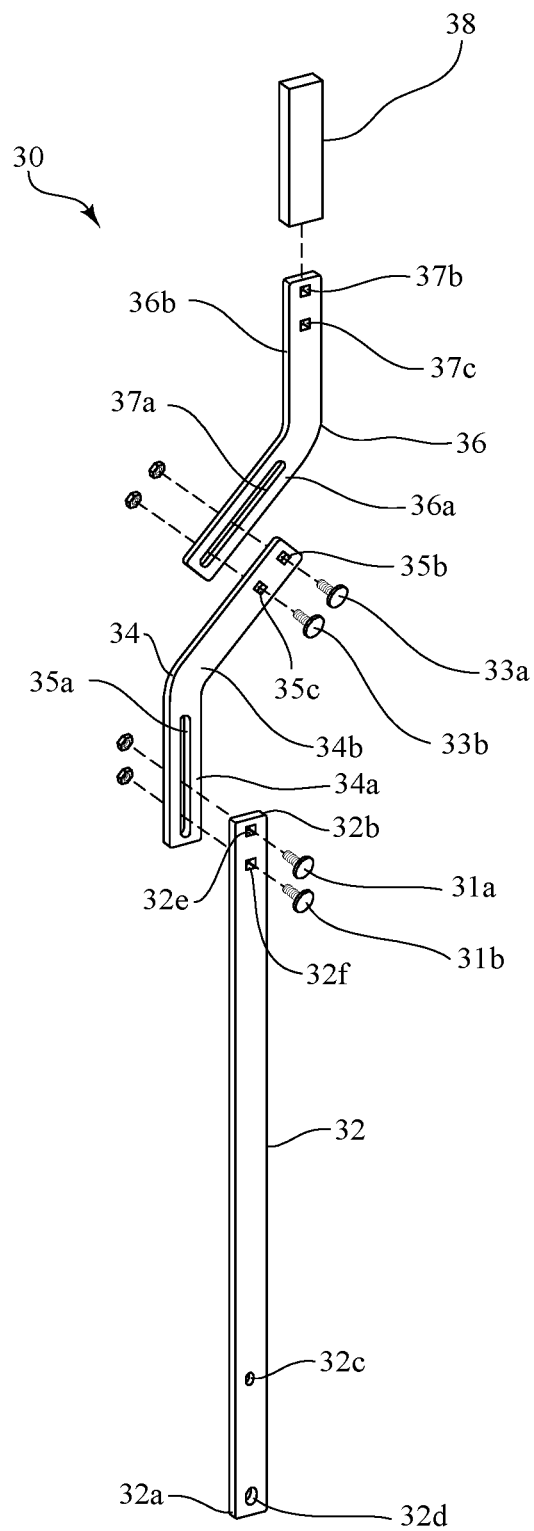
FIG. 2 is an exploded view of the exemplary adjustable handle of FIG. 1.

FIG. 2 is an exploded view of the exemplary adjustable handle 30 of FIG. 1.

Referring now to FIGS. 1, 1A, and 2, the adjustable handle 30 generally comprises: an elongated base portion 32; and one or more links 34, 36 which can be connected (directly or indirectly) to the base portion 32 in different positions and in various configurations via fasteners 31a, 31b, 33a, 33b to affect the overall height and configuration (or shape) of the adjustable handle 30. In this exemplary embodiment, the adjustable handle 30 includes two links: a first link 34; and a second link 36. As will become evident in the discussion that follows with reference to the embodiments illustrated in FIGS. 4A, 4B, and 5-11, embodiments in which the adjustable handle includes less than two links, as well as embodiments in which the adjustable handle includes more than two links, are also disclosed herein and are within the scope of the present invention. The exemplary adjustable handle 30 shown in FIGS. 1, 1A, and 2 may also be characterized as a kit including the respective components of the adjustable handle 30 described herein.

Referring still to FIGS. 1, 1A, and 2, a proximal end 32a of the base portion 32 (which may also be characterized as the proximal end of the adjustable handle 30) is mounted for rotation relative to the tow bar 28, such that movement (rotation) of the base portion 32 of the adjustable handle 30 forward and rearward (around a pivot axis) causes a corresponding movement of the gate 24. In this exemplary embodiment, an enclosure 25 is mounted on the upper surface of the tow bar 28. The proximal end 32a of the base portion 32 is positioned in this enclosure 25 (with the base portion 32 extending up and through a slot 25a defined by the enclosure 25). A pivot pin 27 extends through the enclosure 25 and through an opening 32d defined by the proximal end 32a of the base portion 32, thus defining a pivot axis for rotation of the adjustable handle 30 relative to the tow bar 28, in the same as manner described in U.S. Pat. No. 8,074,904. Of course, alternative embodiments in which the base portion 32 is pivotally mounted directly to the tow bar 28 are, however, also contemplated herein.

Referring still to FIGS. 1, 1A, and 2, the base portion 32 is operably connected to the gate 24 of the broadcast spreader 10 via the linking rod 26, which may be of either flexible or rigid construction. In this exemplary embodiment, the distal end 26b of the linking rod 26 has an integral hook at its distal end 26b, and the base portion 32 defines an opening 32c for receiving a distal end 26b of the linking rod 26.

Referring now to FIG. 2, in this exemplary embodiment, the distal end 32b of the base portion 32 defines at least two openings 32e, 32f which facilitate connection of the first link 34 or the second link 36 to the base portion 32 via fasteners 31a, 31b, as further described below. In this exemplary embodiment, the fasteners 31a, 31b are nut-and-bolt fasteners. Of course, alternative fasteners which can be selectively inserted and removed to facilitate connection or disconnection of the first link 34 or the second link 36 to the base portion 32 may also be utilized without departing from the spirit or scope of the present invention. Furthermore, embodiments in which a single fastener is utilized to secure the first link 34 or the second link 36 to the base portion 32 are also contemplated herein.

Referring now specifically to FIGS. 1A and 2, the first link 34 is a unitary member which defines, and thus can be characterized as including, a first leg 34a and a second leg 34b. In this exemplary embodiment, the first leg 34a and the second leg 34b of the first link 34 are oriented relative to one another at an angle of approximately 135°. As such, the first link 34 may be characterized as an "elbow link" or an "angled link." In this exemplary embodiment, the first leg 34a of the first link 34 defines, and thus may be characterized as including, an elongated slot 35a, and the second leg 34b of the first link 34 defines, and thus may be characterized as including, at least two openings 35b, 35c, the importance of which will be described below.

Referring still to FIGS. 1A and 2, the second link 36 has a construction that is identical to that of the first link 34. In this regard, the second link 36 is also a unitary member which defines, and thus can be characterized as including, a first leg 36a and a second leg 36b. In this exemplary embodiment, the first leg 36a and the second leg 36b of the second link 36 are oriented relative to one another at an angle of approximately 135°. As such, the second link 36 may also be characterized as an "elbow link" or an "angled link." In this exemplary embodiment, the first leg 36a of the second link 36 defines, and thus may be characterized as including, an elongated slot 37a, and the second leg 36b of the second link 36 defines, and thus may be characterized as including, at least two openings 37b, 37c, the importance of which will be described below. In this exemplary embodiment, the second leg 36b of the second link 36 defines two openings 37b, 37c.

Referring now again to FIGS. 1, 1A, and 2, as the first link 34 and the second link 36 are of identical construction, either the first link 34 or the second link 36 can be mounted to the distal end 32b of the base portion 32 by inserting fasteners 31a, 31b through the two openings 32e, 32f defined by the distal end 32b of the base portion 32 and either the elongated slot 35a, 37a or the two openings 35b, 35c, 37b, 37c defined by the first link 34 or the second link 36. As shown, in this implementation, the first link 34 is mounted to the distal end 32b of the base portion 32, and the second link 36 is then mounted to the first link 34. More specifically, in this implementation, the first leg 34a of the first link 34 is mounted to the distal end 32b of the base portion 32 by inserting fasteners 31a, 31b through the elongated slot 35a of the first leg 34a of the first link 34 and the two openings 32e, 32f defined by the distal end 32b of the base portion 32. The second leg 34b of the first link 34 is mounted to the first leg 36a of the second link 36 by inserting fasteners 33a, 33b through the two openings 35b, 35c of the first link 34 and the elongated slot 37a of the second link 36. In this exemplary embodiment, the fasteners 33a, 33b are also nut-and-bolt fasteners. Of course, alternative fasteners which can be selectively inserted and removed to facilitate connection or disconnection of the second link 36 to the first link 34 may also be utilized without departing from the spirit or scope of the present invention. Furthermore, embodiments in which a single fastener is utilized to secure the first link 34 to the second link 36 are also contemplated herein.

Referring still to FIGS. 1, 1A, and 2, the elongated slot 35a of the first link 34 permits the first link 34 to be connected to the distal end 32b of the base portion 32 at different locations along the length of the first leg 34a of the first link 34. Accordingly, the overall height of the adjustable handle 30 can be adjusted by connecting the distal end 32b of the base portion 32 at different locations along the length of the first leg 34a of the first link 34, as evidenced by viewing and comparing FIG. 1 (where the height exhibited by the base portion 32 and the first link 34 is minimized by virtue of fasteners 31a, 31b being inserted through the upper portion of the elongated slot 35a of the first link 34) and FIG. 1A (where the height exhibited by the base portion 32 and the first link 34 is maximized by virtue of fasteners 31a, 31b being inserted through the lower portion of the elongated slot 35a of the first link 34). In this way, the first link 34 can thus be selectively connected to the base portion 32 via the elongated slot 35a of the first link 34 to affect the overall height of the adjustable handle 30.

Referring still to FIGS. 1, 1A, and 2, in this exemplary embodiment, where fasteners 31a, 31b are nut-and-bolt fasteners, a clamping force sufficient to prevent movement of the first link 34 relative to the base portion 32 can be selectively imposed by tightening the fasteners 31a, 31b. Movement of the first link 34 relative to the base portion 32 is also restricted by virtue of the two openings 32e, 32f defined by the distal end 32b of the base portion 32 having a fastener inserted therethrough. In this regard, should the fasteners 31a, 31b not be fully tightened, one fastener will limit the extent to which the first link 34 can pivot about the other fastener. As such, during assembly of the adjustable handle 30, each respective link of the adjustable handle 30 is preferably mounted to the base portion 32 or another link of the adjustable handle 30 by aligning the elongated slot defined by the link with either the two openings 32e, 32f defined by the base portion 32 or the two openings defined by another link of the adjustable handle 30 and inserting fasteners 31a, 31b or fasteners 33a, 33b therethrough. To increase the height exhibited by the base portion 32 and the first link 34, the fasteners 31a, 31b can be loosened to permit travel of the fasteners 31a, 31b along the elongated slot 35a defined by the first leg 34a of the first link 34.

Referring still to FIGS. 1, 1A, and 2, the overall height of the adjustable handle 30 can be similarly adjusted by connecting the second leg 34b of the first link 34 at different locations along the length of the first leg 36a of the second link 36 based on which portion of the elongated slot 37a fasteners 33a, 33b are inserted, as evidenced by viewing and comparing FIG. 1 (where the height exhibited by the first link 34 and the second link 36 is minimized by virtue of fasteners 33a, 33b being inserted through the upper portion of the elongated slot 37a of the second link 36) and FIG. 1A (where the height exhibited by the first link 34 and the second link 36 is maximized by virtue of fasteners 33a, 33b being inserted through the lower portion of the elongated slot 37a of the second link 36). In this way, the second link 36 can thus be selectively connected to the first link 34 via the elongated slot 37a of the second link 36 to affect the overall height of the adjustable handle 30. When the height exhibited by the base portion 32 and the first link 34, and the height exhibited by the first link 34 and the second link 36 are minimized, the adjustable handle 30 may be characterized as being in a retracted position. Conversely, when the height exhibited by the base portion 32 and the first link 34 and the height exhibited by the first link 34 and the second link 36 are maximized, the adjustable handle 30 may be characterized as being in an extended position.

Again, as noted above, where the first link 34 and the second link 36 are of identical construction, in alternative implementations, the second link 36 may be selectively connected to the distal end 32b of the base portion 32 via the elongated slot 37a of the second link 36, and the first link 34 may be selectively connected to the second leg 36b of the second link 36 via the elongated slot 35a of the first link 34.

Referring still to FIGS. 1, 1A, and 2, in this exemplary embodiment, where fasteners 33a, 33b are nut-and-bolt fasteners, a clamping force sufficient to prevent movement of the second link 36 relative to the first link 34 can be selectively imposed by tightening the fasteners 33a, 33b. Movement of the second link 36 relative to the first link 34 is also restricted by virtue of the two openings 35b, 35c defined by the second leg 34b of the first link 34 having a fastener inserted therethrough. In this regard, should the fasteners 33a, 33b not be fully tightened, one fastener will limit the extent to which the second link 36 can pivot about the other fastener. To increase the height exhibited by the first link 34 and the second link 36, the fasteners 33a, 33b can be loosened to permit travel of the fasteners 33a, 33b along the elongated slot 37a defined by the first leg 36a of the first link 34.

Figure 3A:
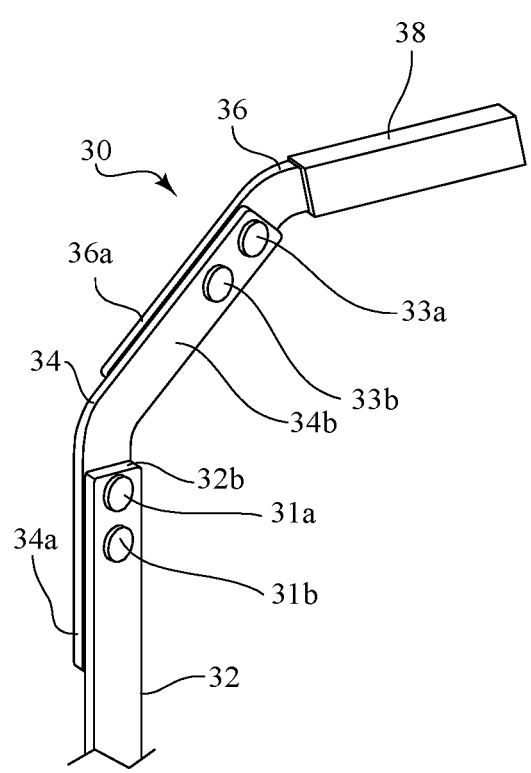
FIG. 3A is a partial perspective view of the exemplary adjustable handle of FIG. 1, but with the respective components of the adjustable handle arranged in a different configuration as compared to FIG. 1.
Figure 3B:
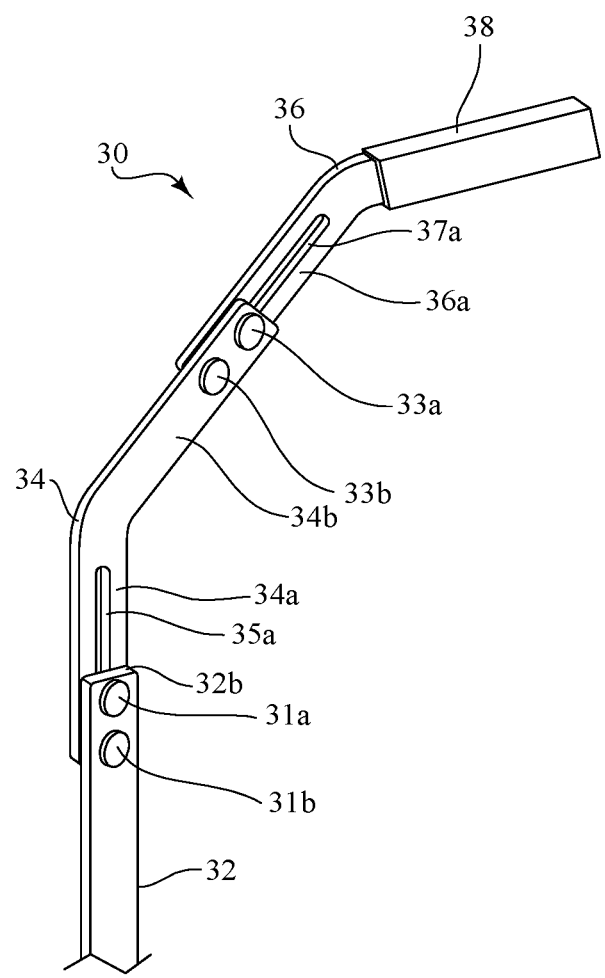
FIG. 3B is another partial perspective view of the exemplary adjustable handle of FIG. 3A, but with the adjustable handle in an extended position as compared to FIG. 3A.

FIGS. 3A and 3B are partial perspective views of the exemplary adjustable handle 30, but with the respective components of the adjustable handle 30 arranged in a different configuration as compared to that shown in FIGS. 1 and 1A.

As shown by comparing FIGS. 1 and 1A to FIGS. 3A and 3B, in this exemplary embodiment, the adjustable handle 30 can be assembled as to assume different shapes (or configurations) by adjusting the orientation in which the second link 36 is mounted to the first link 34. In this regard, the second link 36 can be mounted to the first link 34 so that the second leg 36b of the second link 36 is pointing upward (as in FIGS. 1 and 1A) or forwardly (i.e., toward the tractor or vehicle behind which the broadcast spreader 10 is towed) (as in FIGS. 3A and 3B). In this way, the second link 36 may be "flipped" to alter the configuration of the adjustable handle 30. As evidenced by viewing FIGS. 1 and 1A in sequence, and viewing FIGS. 3A and 3B in sequence, regardless of which configuration the adjustable handle 30 is in, the height exhibited by the first link 34 and the second link 36, and thus the adjustable handle 30 as a whole, can be adjusted in the manner described above. The above-identified configurations of the adjustable handle 30 can be achieved even when the first link 34 and the second link 36 are swapped so that the second link is selectively connected to the distal end 32b of the base portion 32 and the first link 34 is selectively connected to the second link 36.

Referring now to FIGS. 1, 1A, 2, 3A, and 3B, in this exemplary embodiment, the base portion 32, the first link 34, and the second link 36 are each constructed of a metal material, such as steel. Of course, one of ordinary skill in the art will readily recognize and appreciate that the base portion 32, the first link 34, and/or the second link 36 can be constructed of different materials without departing from the spirit and scope of the present invention. As shown, the adjustable handle 30 can optionally further include a grip 38 configured to wrap around and/or enclose an end of the link defining the terminal end of the adjustable handle 30. In some embodiments, the grip 38 may be constructed of a plastic or rubber material for operator comfort while engaging the adjustable handle 30.

Figure 4A:
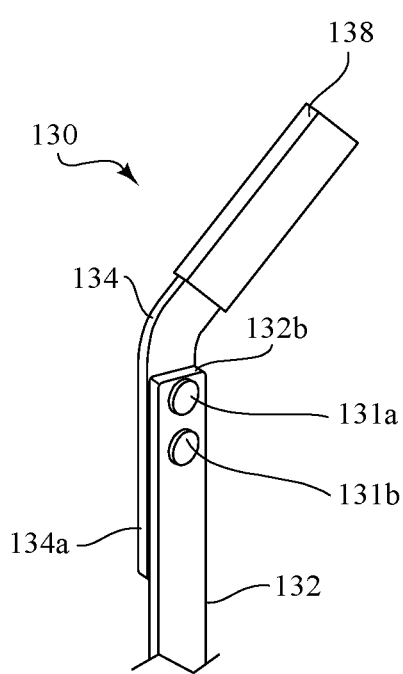
FIG. 4A is a partial perspective view of another exemplary adjustable handle made in accordance with the present invention.
Figure 4B:
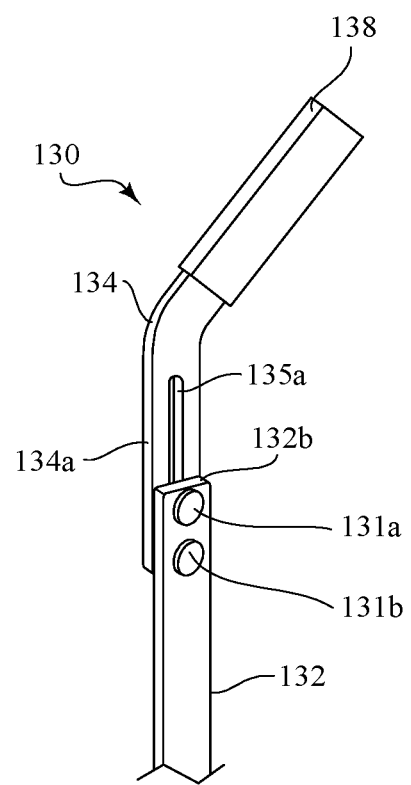
FIG. 4B is another partial perspective view of the exemplary adjustable handle of FIG. 4A, but with the adjustable handle in an extended position as compared to FIG. 4A.

FIGS. 4A and 4B are partial perspective views of another exemplary adjustable handle 130 made in accordance with the present invention. The exemplary adjustable handle 130 shown in FIGS. 4A and 4B may also be characterized as a kit including the respective components of the adjustable handle 130 described herein.

Referring now to FIGS. 4A and 4B, the adjustable handle 130 is of the same construction as the adjustable handle 30 described above with reference to FIGS. 1, 1A, 2, 3A, and 3B, except that, in this exemplary embodiment, the adjustable handle 130 only includes a single link 134. The base portion 132, fasteners 131a, 131b, grip 138, and single link 134 illustrated in FIGS. 4A and 4B are of identical construction as the base portion 32, fasteners 31a, 31b, grip 38, and first link 34 of the adjustable handle 30 described above with reference to FIGS. 1, 1A, 2, 3A, and 3B. Accordingly, the height exhibited by the base portion 132 and the single link 134, and thus overall height of the adjustable handle 130, can be adjusted by connecting the distal end 132b of the base portion 132 at different locations along the length of the first leg 134a of the single link 134 via the elongated slot 135a.

FIGS. 5 and 7-11 are partial perspective views of another exemplary adjustable handle 230 made in accordance with the present invention in various configurations.

Figure 5:
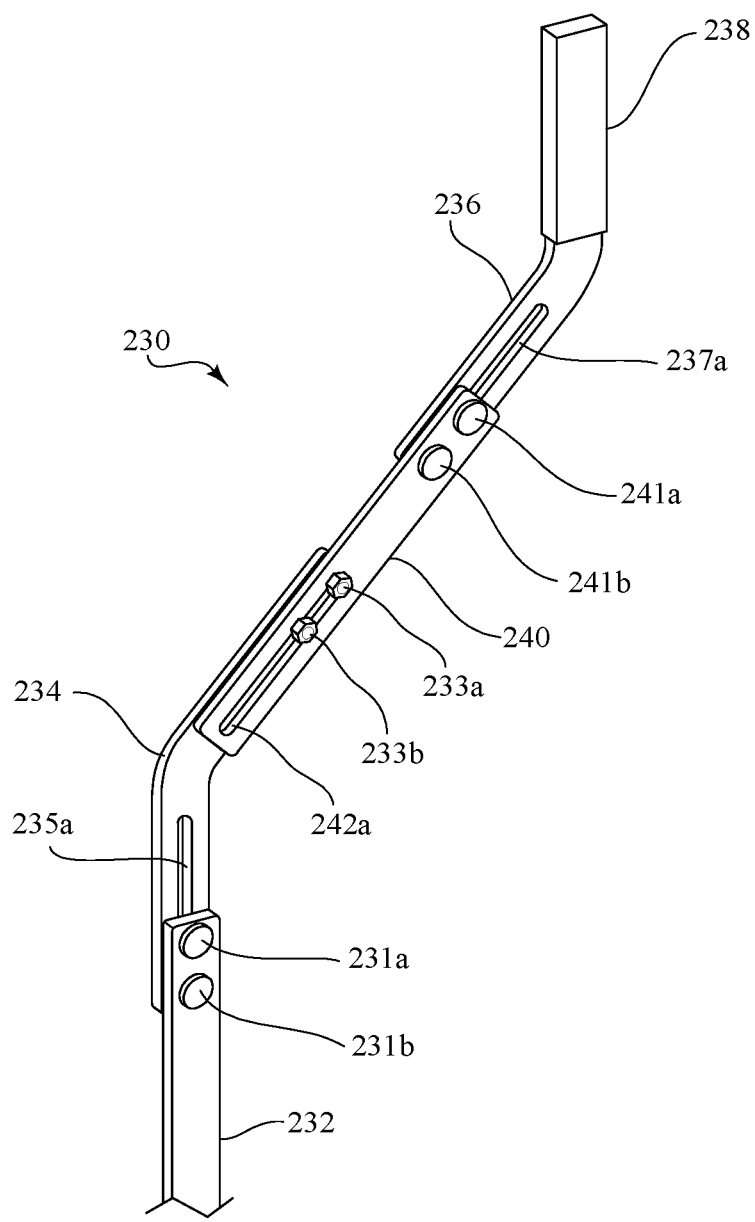
FIG. 5 is a partial perspective view of another exemplary adjustable handle made in accordance with the present invention.
Figure 6:
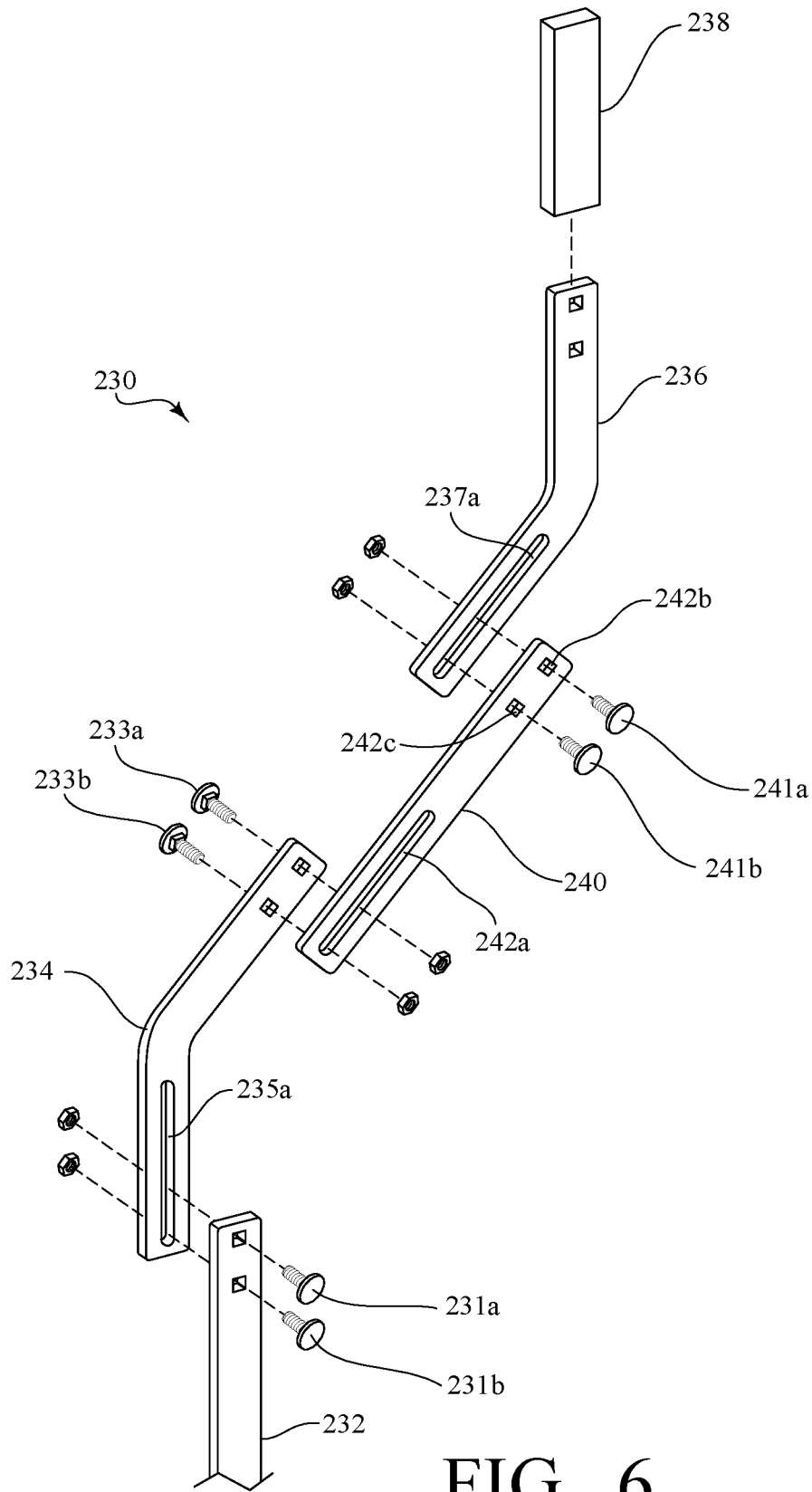
FIG. 6 is an exploded view of the exemplary adjustable handle of FIG. 5.
Figure 7:
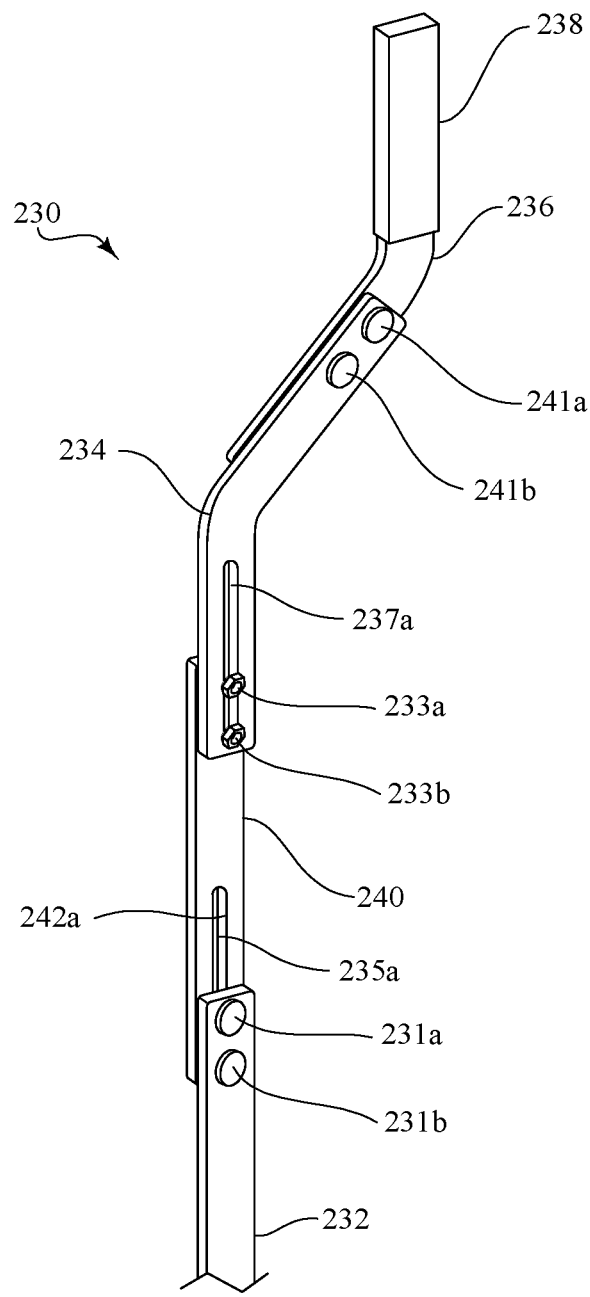
FIG. 7 is another partial perspective view of the exemplary adjustable handle of FIG. 5, but with the respective components of the adjustable handle arranged in a different configuration as compared to FIG. 5.
Figure 8:
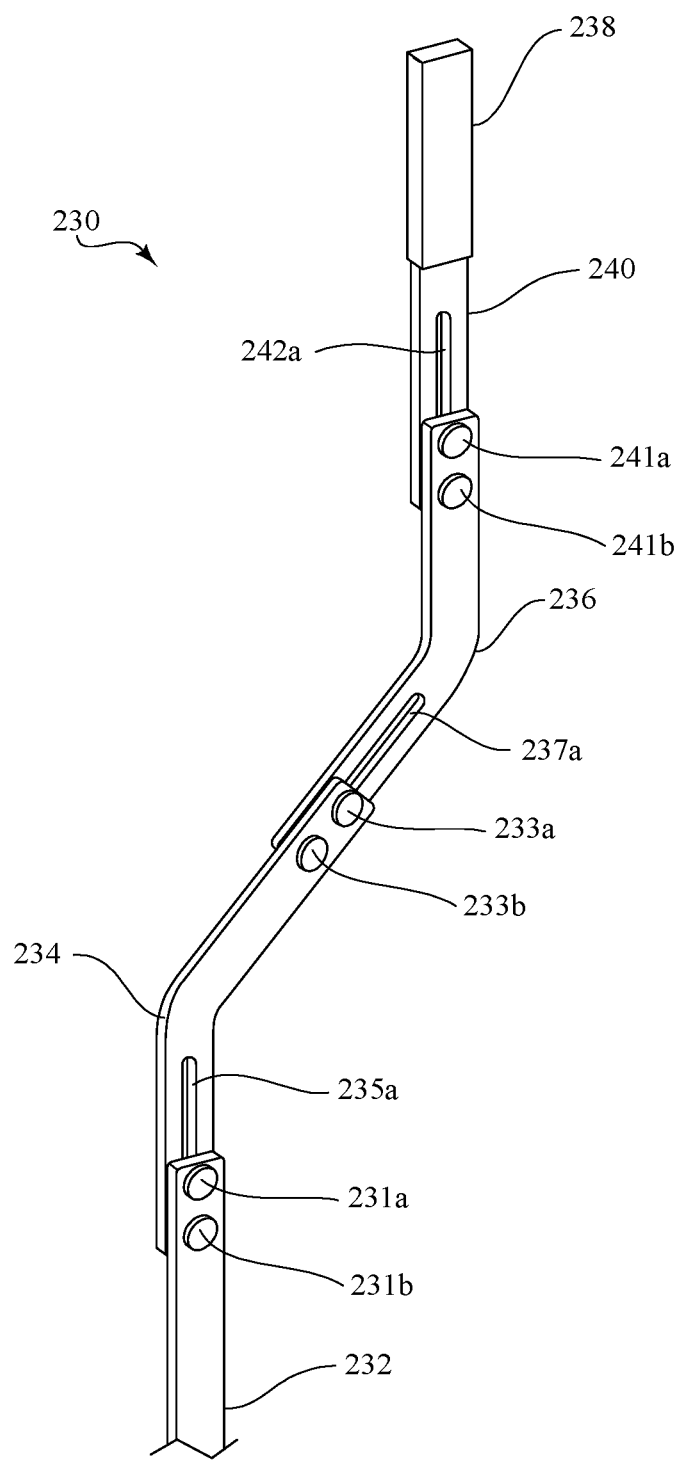
FIG. 8 is another partial perspective view of the exemplary adjustable handle of FIG. 5, but with the respective components of the adjustable handle arranged in a different configuration as compared to FIG. 5.
Figure 9:
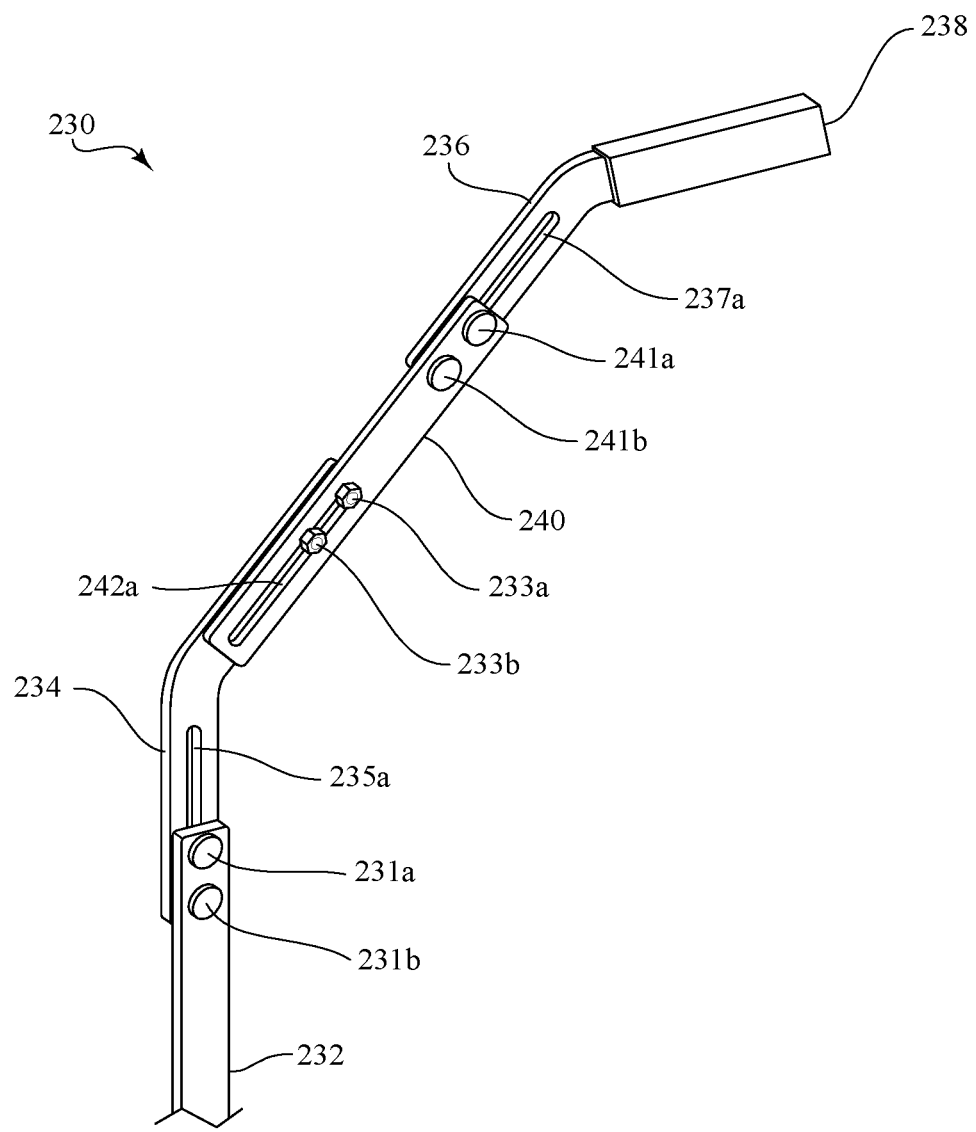
FIG. 9 is another partial perspective view of the exemplary adjustable handle of FIG. 5, but with the respective components of the adjustable handle arranged in a different configuration as compared to FIG. 5.
Figure 10:
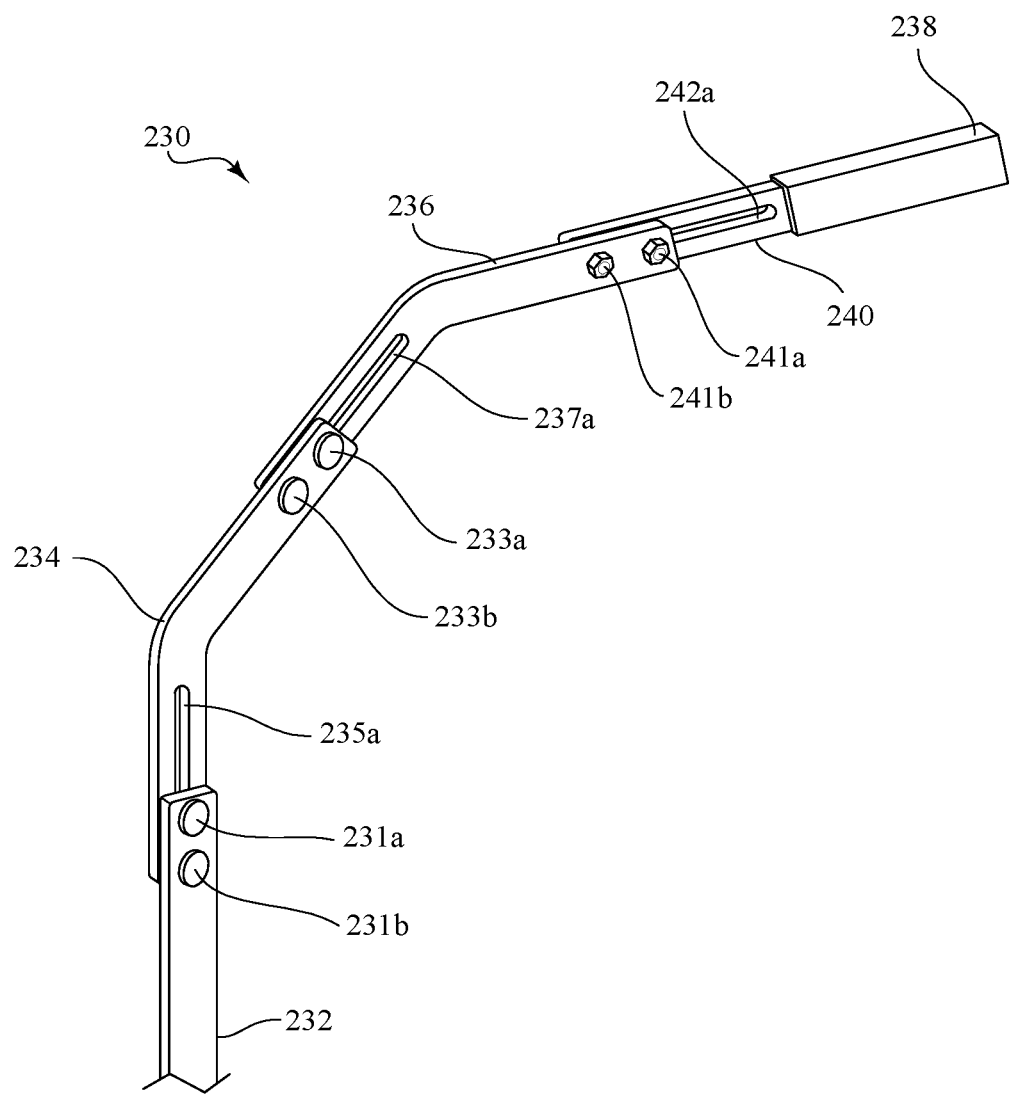
FIG. 10 is another partial perspective view of the exemplary adjustable handle of FIG. 5, but with the respective components of the adjustable handle arranged in a different configuration as compared to FIG. 5.
Figure 11:
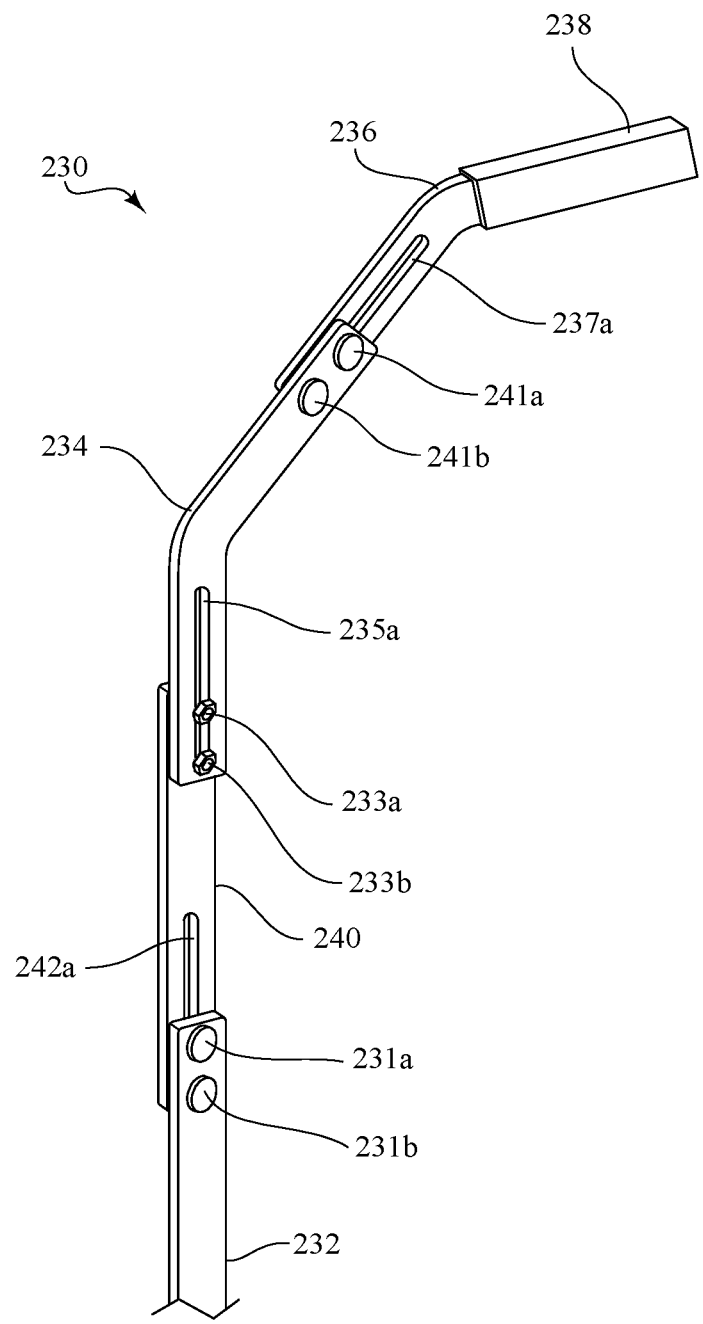
FIG. 11 is another partial perspective view of the exemplary adjustable handle of FIG. 5, but with the respective components of the adjustable handle arranged in a different configuration as compared to FIG. 5.

FIG. 6 is an exploded view of the exemplary adjustable handle 230 in the configuration shown in FIG. 5. The exemplary adjustable handle 230 shown in FIGS. 5-11 may also be characterized as a kit including the respective components of the adjustable handle 230 described herein.

As shown in FIGS. 5-11, in this exemplary embodiment, the adjustable handle 230 includes a base portion 232, a grip 238, and three links: a first link 234; a second link 236; and a third link 240, each of which can be connected (directly or indirectly) to the base portion 232 via fasteners 231a, 231b, 233a, 233b, 241a, 241b in different positions and various configurations to affect the overall height and configuration of the adjustable handle 230. The base portion 232, the first link 234, the second link 236, and fasteners 231a, 231b, 233a, 233b are of identical construction to the base portion 32, first link 34, second link 36, and fasteners 31a, 31b, 33a, 33b, respectively, of the adjustable handle 30 described above with reference to FIGS. 1, 1A, and 2. The additional component in this exemplary embodiment is the third link 240. Unlike the first link 234 and the second link 236, however, the third link 240 has no bend or curvature, and thus may be characterized as a "straight" link. Accordingly, in this exemplary embodiment, the adjustable handle 230 includes two angled links and a single straight link.

Referring still to FIGS. 5-11, like the first link 234 and the second link 236, the third link 240 is a unitary member which defines, and thus may be characterized as including, on one end, an elongated slot 242a and, on another end, at least two openings 242b, 242c which can be utilized to secure the third link 240 to the base portion 232 or another link 234, 236 of the adjustable handle 230. The elongated slot 242a of the third link 240 permits the height exhibited by the third link 240 and either the base portion 232 or another link 234, 236 of the adjustable handle 230, and thus the overall height of the adjustable handle 230, to be adjusted by securing the base portion 232 or other link at different locations along the length of the third link 240 via fasteners 231a, 231b, fasteners 233a, 233b, or fasteners 241a, 241b in the same manner as described above with respect to the first link 34 and the second link 36 of the adjustable handle 30 described above with reference to FIGS. 1, 1A, and 2. In this way, the third link 240 can thus be selectively connected to the base portion 232 or another link 234, 236 of the adjustable handle 230.

Referring still to FIGS. 5-11, during assembly, each respective link 234, 236, 240 of the adjustable handle 230 is preferably mounted to the base portion 232 or another link 234, 236, 240 of the adjustable handle 230 by aligning the elongated slot 235a, 237a, 242a defined by the respective link 234, 236, 240 with either the two openings 232a, 232b defined by the base portion 232 or the two openings defined by another link 234, 236, 240 of the adjustable handle 230 and inserting fasteners 231a, 231b, fasteners 233a, 233b, or fasteners 241a, 241b therethrough. Securing each respective link 234, 236, 240 in the foregoing manner will restrict movement of the link 234, 236, 240 relative to the base portion 232 or other link 234, 236, 240 of the adjustable handle 230 to which the link 234, 236, 240 is mounted as one fastener inserted through one of the two openings 232a, 232b defined by the base portion 232 or one of the two openings defined by another link 234, 236, 240 of the adjustable handle 230 will limit the extent to which the link 234, 236, 240 can pivot about the other fastener inserted through the other of the two openings 232a, 232b defined by the base portion 232 or the other of the two openings defined by another link 234, 236, 240 of the adjustable handle 230 should the fasteners 231a, 231a, 233a, 233b, 241a, 241b not be fully tightened.

As shown in FIGS. 5-11, the third link 240 can be mounted to the first link 234 and the second link 236 via fasteners 231a, 231b, 233a, 233b (FIGS. 5 and 9), the base portion 232 and the first link 234 or the second link 236 (FIGS. 7 and 11) via fasteners 231a, 231b and fasteners 233a, 233b, or the first link 234 or the second link 236 alone (FIGS. 8 and 10) via fasteners 241a, 241b. Accordingly, the third link 240 can be used to effectively extend and/or alter the shape of the adjustable handle configurations shown in FIGS. 1, 1A, 2, 3A, and 3B. Accordingly, the third link 240 further increases the adjustability of the handle 230 relative to the adjustable handle 30 described above with reference to FIGS. 1, 1A, and 2. Of course, in alternative embodiments, the number of angled links and/or straight links could be increased to provide further adjustability and configuration options for the adjustable handle.

Referring still to FIGS. 5-11, in this exemplary embodiment, the base portion 232, the first link 234, the second link 236, and the third link 240 are constructed of a metal material, such as steel. Of course, one of ordinary skill in the art will readily recognize and appreciate that the base portion 232, the first link 234, the second link 236, and/or the third link 240 can be constructed of different materials without departing from the spirit and scope of the present invention. As shown, the adjustable handle 230 can optionally further include a grip 238 configured to wrap around and/or enclose an end of the link defining the terminal end of the adjustable handle 230. In some embodiments, the grip 238 may be constructed of a plastic or rubber material for operator comfort while engaging the adjustable handle 230.

Although not shown, alternative embodiments in which the adjustable handle includes the base portion, a single angled link, and one or more straight links are also contemplated herein.

Although the angled links of the adjustable handles 30, 130, 230 described herein are referred to as being a specific angle in some embodiments, it should be appreciated that the angled links are not necessarily limited to such construction. Rather, in alternative embodiments, some or all of the angled links of the adjustable handles 30, 130, 230 described herein may be modified so that the first leg and the second leg of such link(s) are oriented relative to each other angles besides those described above to better accommodate operator need or preference without departing from the spirit and scope of the present invention. In this regard, embodiments in which some or all of the angled links of the adjustable handles 30, 130, 230 described herein have a first leg and a second leg which are oriented at an angle of about 90° to about 179° relative to each other are also contemplated herein.

One of ordinary skill in the art will recognize that additional embodiments and implementations are also possible without departing from the teachings of the present invention. This detailed description, and particularly the specific details of the exemplary embodiments and implementations disclosed herein, are given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. An adjustable handle for a broadcast spreader, comprising:
    a base portion configured to be operably connected to a gate of the broadcast spreader, such that, when the base portion is operably connected to the gate, movement of the base portion causes a corresponding movement of the gate; and
    one or more links configured to be selectively connected to the base portion, wherein a particular link of the one or more links can be selectively connected to a distal end of the base portion at different locations along a length of the particular link to affect a height of the adjustable handle;
    wherein each link of the one or more links defines an elongated slot configured to receive one or more fasteners; and
    wherein the distal end of the base portion defines at least two openings configured to receive the one or more fasteners.

2. The adjustable handle according to claim 1, wherein a proximal end of the base portion defines a first opening for receiving a pivot pin and a second opening for receiving a linking rod connected to the gate of the broadcast spreader.

3. The adjustable handle according to claim 1, wherein the one or more links includes multiple links.

4. The adjustable handle according to claim 1, and further comprising a grip configured to enclose a link of the one or more links defining a terminal end of the adjustable handle.

5. An adjustable handle for a broadcast spreader, comprising:
- a base portion configured to be operably connected to a gate of the broadcast spreader, such that, when the base portion is operably connected to the gate, movement of the base portion causes a corresponding movement of the gate; and
- multiple links configured to be selectively connected to the base portion, wherein a particular link of the multiple links can be selectively connected to a distal end of the base portion at different locations along a length of the particular link to affect a height of the adjustable handle;
- wherein each link of the multiple links defines an elongated slot and at least two openings, and wherein the elongated slot and the at least two openings of each link are each configured to receive one or more fasteners for connecting the link to the distal end of the base portion or another link of the multiple links.

6. The adjustable handle according to claim 5, wherein at least one link of the multiple links includes a first leg defining the elongated slot and a second leg defining the at least two openings, and wherein the first leg and the second leg are angled relative to each other.

7. The adjustable handle according to claim 6, wherein the first leg and the second leg are oriented relative to one another at an angle of approximately 135°.

8. The adjustable handle according to claim 6, wherein at least one link of the multiple links is a straight link.

9. An adjustable handle for a broadcast spreader, comprising:
- a base portion configured to be operably connected to a gate of the broadcast spreader, such that, when the base portion is operably connected to the gate, movement of the base portion causes a corresponding movement of the gate, wherein the base portion includes a distal end defining at least two openings; and
- multiple links, with each link of the multiple links defining an elongated slot for receiving one or more fasteners to connect the link to the distal end of the base portion or to connect the link to another link of the multiple links.

10. The adjustable handle according to claim 9, wherein the multiple links includes at least one angled link, each angled link including a first leg defining the elongated slot of the angled link and a second leg defining at least two openings, and wherein the first leg and the second leg are angled relative to each other.

11. The adjustable handle according to claim 10, wherein the first leg and the second leg are oriented relative to one another at an angle of approximately 135°.

12. The adjustable handle according to claim 11, wherein each link of the multiple links is an angled link.

13. The adjustable handle according to claim 11, wherein at least one link of the multiple links is a straight link including a first end defining the elongated slot of the straight link and a second end defining at least two openings.

14. The adjustable handle according to claim 13, wherein the multiple links include at least two angled links.

15. The adjustable handle according to claim 9, and further comprising a grip configured to enclose a link of the multiple links defining a terminal end of the adjustable handle.

16. A broadcast spreader, comprising:
- a hopper adapted to store granular material and including a discharge port through a surface thereof;
- a fan configured to rotate about an axis to distribute the granular material passing from the hopper through the discharge port; and
- a gate movably mounted to the hopper, such that the gate can transition between at least a first position and a second position relative to the discharge port;
- a linking rod with a proximal end connected to the gate; and
- an adjustable handle, the adjustable handle including
  - a base portion connected to a distal end of the linking rod, such that movement of the base portion causes corresponding movement of the gate, and
  - one or more links configured to be selectively connected to the base portion, wherein a particular link of the one or more links can be selectively connected to a distal end of the base portion at different locations along a length of the particular link to affect a height of the adjustable handle,
  - wherein each link of the one or more links defines an elongated slot configured to receive one or more fasteners, and
  - wherein a distal end of the base portion defines at least two openings configured to receive the one or more fasteners.

* * * * *